United States Patent
Raynor et al.

(10) Patent No.: US 8,228,410 B2
(45) Date of Patent: Jul. 24, 2012

(54) IMAGE SENSORS INCLUDING A SHIELDED PHOTOSENSITIVE PORTION FOR NOISE CANCELLATION AND ASSOCIATED METHODS

(75) Inventors: Jeff Raynor, Edinburgh (GB); Mitchell Perley O'Neal, Edinburgh (GB)

(73) Assignee: STMicroelectronics (Research & Development) Limited, Marlow-Buckinghamshire (GB)

( * ) Notice: Subject to any disclaimer, the term of this patent is extended or adjusted under 35 U.S.C. 154(b) by 996 days.

(21) Appl. No.: 12/046,806

(22) Filed: Mar. 12, 2008

(65) Prior Publication Data

US 2008/0225140 A1    Sep. 18, 2008

(30) Foreign Application Priority Data

Mar. 16, 2007    (EP) ..................................... 07270014

(51) Int. Cl.
- *H04N 9/64* (2006.01)
- *H04N 3/14* (2006.01)
- *H04N 5/335* (2011.01)

(52) U.S. Cl. ........................ 348/301; 348/243
(58) Field of Classification Search .................. 348/243, 348/245, 300, 301
See application file for complete search history.

(56) References Cited

U.S. PATENT DOCUMENTS

| | | | |
|---|---|---|---|
| 4,453,177 A * | 6/1984 | Berger et al. .................. | 348/282 |
| 4,916,307 A | 4/1990 | Nishibe et al. ................ | 250/214 |
| 4,942,474 A | 7/1990 | Akimoto et al. ......... | 358/213.11 |
| 5,376,966 A | 12/1994 | Takase .......................... | 348/243 |
| 5,642,162 A | 6/1997 | Maki et al. .................... | 348/241 |
| 5,892,540 A * | 4/1999 | Kozlowski et al. ........... | 348/300 |
| 6,067,113 A | 5/2000 | Hurwitz et al. ............... | 348/241 |
| 7,193,199 B2 * | 3/2007 | Jang .............................. | 250/208.1 |
| 7,265,705 B1 * | 9/2007 | Lee et al. ...................... | 341/162 |
| 2002/0085105 A1 | 7/2002 | Sohn ............................. | 348/294 |
| 2002/0167600 A1 * | 11/2002 | Baer ............................. | 348/243 |
| 2003/0034434 A1 * | 2/2003 | Simony ...................... | 250/208.1 |
| 2005/0140538 A1 * | 6/2005 | A .................................. | 341/163 |
| 2006/0065845 A1 * | 3/2006 | Yamaguchi .............. | 250/370.09 |
| 2006/0255152 A1 * | 11/2006 | Xie et al. ................. | 235/472.01 |
| 2008/0135739 A1 * | 6/2008 | Kim et al. .................... | 250/226 |

FOREIGN PATENT DOCUMENTS

| | | |
|---|---|---|
| EP | 1544602 | 6/2005 |
| FR | 2594544 | 8/1987 |
| JP | 61108931 | 5/1986 |

* cited by examiner

*Primary Examiner* — Albert Cutler
(74) *Attorney, Agent, or Firm* — Allen, Dyer, Doppelt, Milbrath & Gilchrist, P.A.

(57) ABSTRACT

A pixel structure includes two different photosensitive portions. One portion is shielded from incident light and the signals from both are fed into an op amp so that the differential signal is output as the pixel output, thereby cancelling dark current.

42 Claims, 21 Drawing Sheets

IMAGE SENSORS INCLUDING A SHIELDED PHOTOSENSITIVE PORTION FOR NOISE CANCELLATION AND ASSOCIATED METHODS

FIELD OF THE INVENTION

The present invention relates to image sensors, in particular, to a method for the cancellation of noise from an image sensor's output which is generated by dark current.

BACKGROUND OF THE INVENTION

Solid state image sensors fabricated from semiconductor materials are well known. A popular class of such device is produced using CMOS processing technologies, which again are well known. An image sensor comprises an image sensing array formed by a number of pixels, and associated circuitry for controlling the operation of the image sensing array and for manipulation of the signals that are output from the image sensing array.

Within the image sensing array, each pixel comprises a photosensitive portion formed for example as a doped region within a semiconductor substrate. The energy of incident photons removes electrons from the outer orbits of atoms within the photosensitive portion thus generating a charge. The photosensitive portion can take different forms, for example a photodiode, photogate, phototransistor, charge-coupled device (CCD), charge injection device (CID), or single photon avalanche diode (SPAD), among others.

The pixel also comprises readout circuitry. There are many different architectures for pixels, including for example the so-called 3T and 4T (pinned photodiode) structures. Other structures such as a so-called 2.5T and a 1.75T pixel are known, which uses shared read-out lines between successive rows of pixels to effectively reduce the number of transistors required per pixel. In any event, regardless of its architecture, the readout circuitry of a pixel will in general provide switching circuit or means for the connection of the photosensitive portion to an output node connected to a readout bus for the transmittal of the charge as a voltage signal, and a reset node for connection with a reset voltage source, and optionally further reference voltages and/or control lines as appropriate. Further components can be incorporated in the pixel's readout circuitry as a design choice made for particular applications. For example, analog-to-digital converter (ADC) circuitry for some applications could be incorporated in the image sensor's associated circuitry, i.e. separate from the image sensing array. However as an alternative, each pixel can be provided with its own ADC circuitry. As another example, an amplifier can be incorporated separate from the image sensing array, or it can be distributed, with one or more of its components being formed as part of the pixel circuitry.

No matter the design choices made in an image sensor's architecture, the term "pixel" is used to refer to a unit element of an image sensing array for generating information about a scene. The photosensitive portion of a pixel makes use of an electric field at a P-N junction to cause the photogenerated electron to move away from the ion and prevent re-combination and loss of the signal. However, these P-N junctions have a small leakage current which the photosensitive portion cannot distinguish from a current which is generated by light. This leakage current is present in the dark, and so this leakage current is commonly known as dark current. The term "dark" is understood to be a condition where light is either absent, or where light that is incident on the image sensor does not cause the photogeneration of charge by the pixels' photosensitive portions. This can either be because the photosensitive portions are shielded, or because they are held at a potential, for example a reset potential, that prevents the accumulation of charge at the photosensitive portions.

This dark current is a primary limiting factor in the performance characteristics of photosensitive portions in CMOS image sensors. Dark current is strongly temperature dependent and this makes it difficult to compensate for. It also varies considerably with any non-uniformity in doping gradients across the die or non-uniformity introduced by etching variations.

One technique known for compensating for dark current is disclosed in European Patent Application EP 1544602A to STMicroelectronics Limited. This application discloses a method wherein a selection of pixels within an array are shielded from incident light and their output is compared with the output of the remaining pixels in an attempt to cancel the dark current. However, the variation of dark current that occurs between successive pixels or successive regions of pixels may still cause an error with a system of this nature. Furthermore, because the signals are taken from the outputs of different pixels further errors are introduced in the switching and transfer of charge needed to obtain the outputs and then compare them.

It is also known to use a shielded border portion of a pixel array to generate a dark current reading which can be subtracted from the outputs of the image sensing array. However, this does not take into account the variation of dark current across the die.

Another technique for cancelling or compensating for dark current noise is to take two reads as disclosed for example in U.S. Pat. No. 4,942,474; U.S. Pat. No. 6,067,113, U.S. Pat. No. 5,376,966 and U.S. Pat. No. 5,642,162. These techniques involve the use of a mechanical shutter to enable or prevent light from reaching the sensor. A first reading is taken without light but with the dark current and a second reading is taken with the light and also the dark current. The two readings are then differenced in an attempt to cancel the dark current. However, as dark current varies with time, the time difference between the successive readings can introduce an error. Furthermore, the action of the first read causes a "self heating" effect, as the power consumed in order to produce the first reading actually increases the temperature of the device and so alters the dark current prior to the second reading. Thus there is an inherent error in the dark current cancellation in these techniques. Furthermore, the use of a mechanical shutter is not suitable for small, lower power schemes.

These problems of spatial and temporal variation of dark current are felt keenly in applications that require the detection of a very small amount of light. Various scientific and industrial applications fall into this category, requiring for example to detect light levels of only a few 10,000 photons per second. One example of a image sensor in this category is a bioluminescence sensor in which an analyte is passed over a reagent provided at the sensor. The chemical reaction between the analyte and reagent produces light, which is then measured and analyzed to provide details about the nature of the analyte. These types of sensors are popular as they do not require a stimulating light source. However, the photo emissions are small. Existing systems use a separate detection system often with separate photo-multiplier systems which add expense and complicate integration (readout) of signal.

Accordingly, there is a need for an improved system and method of dark current cancellation. Such improvements would be useful in the field of image sensors in general, but would be particularly appreciated in fields where an image sensor is used to detect relatively low light levels, such as bio-luminescence sensors, where the light levels of radiation incident on the image sensing array are much smaller than for example the light levels that would be incident on an image sensing array of a digital still camera or mobile telephone camera used in normal domestic circumstances.

SUMMARY OF THE INVENTION

According to a first aspect of the present invention there is provided a pixel for an image sensing array of an image sensor comprising: a first photosensitive portion; a second photosensitive portion shielded from incident light; and an operational amplifier arranged to receive a signal from the first photosensitive portion at a first input, and to receive a signal from the second photosensitive portion at a second input.

Preferably, the operational amplifier is provided with a negative feedback loop comprising a feedback capacitance and switch means for discharging the operational amplifier. Preferably, the capacitance of the feedback capacitor is chosen to be the same as the capacitance of the second photosensitive portion. Preferably, means are provided for varying the feedback capacitance applied to the operational amplifier. Preferably, the means for varying the feedback capacitance comprises a plurality of ladder capacitors selectively connected in parallel across the operational amplifier in any combination.

Preferably, a base feedback capacitor is permanently connected across the operational amplifier. Preferably, the capacitance of the base feedback capacitor is less than the capacitance of the second photosensitive portion. Preferably, the ladder capacitors comprise at least two capacitors having equal capacitances. Preferably, the ladder capacitors comprise a series of capacitors whose values are successively incremented in a binary exponential fashion.

Preferably, the pixel comprises a memory or means in which is stored the difference between a dark current generated by the first photosensitive portion and a dark current generated by the second photosensitive portion. Preferably, the first and second photosensitive portions are adjacent each other and pixel readout electronics are provided adjacent both the first and second photosensitive portions. Preferably, the first photosensitive portion, second photosensitive portion and readout electronics are stacked vertically.

Preferably, the first and second photosensitive portions are provided in a common centroid format, comprising diagonally separated sub-portions. Preferably, the first and second photosensitive portions comprise respective triangular portions. Preferably, one of the first and second photosensitive portions comprises a rotated square shape and the other of the first and second photosensitive portions comprises triangular portions provided at each face of the square.

Preferably, a guard ring structure is provided at a boundary between the photosensitive portions and the pixel readout circuitry. Preferably, each input of the operational amplifier is provided with two connection ports, provided at opposing sides of the readout electronics structure. Preferably, each photosensitive portion comprises one or more collection nodes, which are formed as islands surrounded by epitaxial material.

Preferably, the surface of the photosensitive portions is covered by a conducting layer that is electrically connected to the readout electronics, except for a narrow zone around the or each collection node. Preferably, the second photosensitive portion is provided around the first photosensitive portion. Preferably, the second photosensitive portion occupies a lesser surface area than the first photosensitive portion. Preferably, the spacing of collection nodes in the second photosensitive portion is less than the spacing of collection nodes in the first photosensitive portion.

Preferably, the pixel comprises a metal layer formed selectively over the second photosensitive portion to shield it from incident light. Preferably, the pixel comprises a barrier for constraining a bio-optical analyte to an area overlying the first photosensitive portion, thereby shielding the second photosensitive portion from incident light generated by a chemical reaction between the analyte and a reagent.

According to a second aspect, there is provided a plurality of pixels according to the first aspect, formed as an array. Preferably, the array comprises a first row of pixels oriented in a first direction, and a second row of pixels oriented in a vertically opposite direction. Preferably, adjacent pixels in one or both of the rows have opposite horizontal orientations. Preferably, the orientation of the readout electronics is constant across the array.

According to a third aspect there is provided an image sensor comprising: an image sensing array comprising a plurality of pixels according to the first aspect; and associated circuitry for controlling the operation of the image sensing array and for manipulation of the signals that are output from the image sensing array.

Preferably, the plurality of pixels comprises a first row of pixels oriented in a first direction, and a second row of pixels oriented in a vertically opposite direction. Preferably, adjacent pixels in one or both of the rows have opposite horizontal orientations. Preferably, the orientation of the readout electronics is constant across the array.

According to a fourth aspect, there is provided a bio-luminescence sensing system comprising an image sensor according to the third aspect.

According to a fifth aspect there is provided an intra-pixel method for cancellation of dark current noise, comprising: generating a first input for an operational amplifier based on a signal from a first photosensitive portion; generating a second input for an operational amplifier based on a signal from a second photosensitive portion shielded from incident light; and outputting the differential signal from the operational amplifier as a dark-current-cancelled pixel output.

Preferably, the operational amplifier is provided with a negative feedback loop comprising a feedback capacitance and switch means for discharging the operational amplifier. Preferably, the capacitance of the feedback capacitor is chosen to be the same as the capacitance of the second photosensitive portion.

Preferably, the method comprises varying the feedback capacitance which is applied across the operational amplifier. Preferably, the step of varying the feedback capacitance comprises the selective connection of one or more of a plurality of ladder capacitors in any combination which are connected in parallel across the operational amplifier.

Preferably, a difference between a dark current generated by the first photosensitive portion and a dark current generated by the second photosensitive portion is stored in a memory or memory means, the method comprising reading the stored difference and using it as a basis for the quantum of variation to be applied to the feedback capacitance.

Preferably, the ratio of the dark current in the first photosensitive portion to the feedback capacitance of the operational amplifier is set to be equal to the ratio of the dark current in the second photosensitive portion to the intrinsic capacitance of that photosensitive portion. Preferably, the dark current in each photosensitive portion is set to be equal and the capacitance of the second photosensitive portion is set to be equal to the feedback capacitance of the operational amplifier.

According to further aspects, the abovementioned pixel, array, sensor and methods can be incorporated in an optical pointing device such as an optical mouse, a camera for a mobile phone, and a mobile phone incorporating the camera, a webcam or an ambient light sensor.

BRIEF DESCRIPTION OF THE DRAWINGS

The present invention will now be described, with reference to the accompanying drawings, in which.

DETAILED DESCRIPTION OF THE PREFERRED EMBODIMENTS

Figure 1:
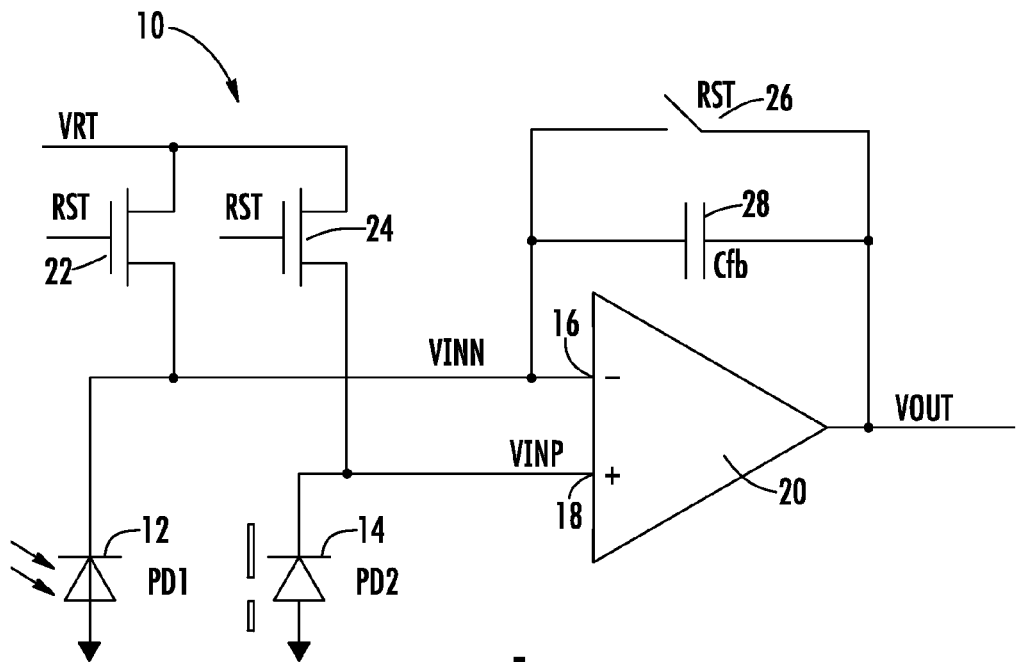
FIG. 1 is a schematic diagram showing a circuit according to a first embodiment of the invention.

In understanding the significance of the following embodiments, it is useful to consider what is meant by a "pixel" of an image sensing array. Derived from the term "picture element", a pixel is a unit of resolution with respect to an image. In the context of a display screen, each pixel corresponds to one dot of the screen, which has specific color and brightness values. In the context of an image sensing array, a pixel is a unit element of the image sensing array for generating information about a scene. Each pixel generates an output which is a measurement of the intensity of light incident on that pixel. The pixel array can be overlaid with color sensitive filters and pixel intensity outputs from each color can be combined to represent the color detail of a scene. A pixel array is typically one-dimensional, that is, comprising a linear row of pixels side by side, or two-dimensional, that is, comprising a plurality of pixels that are arranged in both rows and columns.

As discussed above, a prior art "pixel" in the context of an image sensor comprises a photosensitive portion and readout circuitry. These together define the unit element for generating an intensity value to be output. The photosensitive portion generates a charge in response to incident light and the readout circuitry acts as the interface between the pixel and the external circuitry associated with the image sensing array. The photosensitive portion can comprise a photodiode, photogate or other appropriate structure and is typically formed as a doped region (or "well") within the semiconductor substrate of the image sensor.

The readout circuitry of the pixel provides a number of components, typically transistors, for governing the transfer of the charge generated in the photo sensitive portion. In the example of a three transistor (3T) pixel the readout circuitry comprises a reset transistor, a row select transistor and a source follower transistor. In a four transistor (4T) pixel, a further transfer gate transistor is included for transferring charge to/from a buried photodiode.

The associated circuitry of the image sensor controls the operation of the pixels' readout circuitry and performs processing steps on the output signals. For example, the associated circuitry can comprise shift registers for selection of rows for readout, and analog to digital conversion means for creation of a digital signal.

In consideration of the problems mentioned above with the prior art, a pixel design of the present invention will be described with reference to FIG. 1. This figure is intended for illustration purposes only, and only illustrates selected components of the pixel which are needed for understanding the operation of the embodiment. It is also to be understood that the principles of the layout shown in FIG. 1 can be applied equally to any pixel architecture.

Turning now to discuss the figure, a pixel 10 comprises a first photosensitive portion 12 and a second photosensitive portion 14 which provide respective inverting and non inverting inputs 16, 18 to an operational amplifier 20. The photosensitive portions are illustrated as photodiodes, but it will be understood that any type of photosensor can be used as discussed above. The first photosensitive portion 12 is light sensitive in the normal fashion while the second photosensitive portion 14 is shielded from incident light.

Although the second photosensitive portion is shielded, it is still termed herein as a "photosensitive" portion in the sense that it has similar physical and electrical characteristics as the first photosensitive portion. If it were not for the shielding, the second photosensitive portion would generate a charge in response to incident light. As an example, both the first and second photosensitive portions can be photodiodes, which in a further optional embodiment can be of identical form. A separate opaque shield is then formed over the second photosensitive portion. For ease of reference hereafter, the first photosensitive portion will be designated as a "light" photosensitive portion, while the second photosensitive portion will be designated as a "dark" photosensitive portion.

The shielding is achieved by a mechanical means, for example, by deposition of metal or another opaque substance over the second photosensitive portion 14, either directly onto its surface or as a higher layer, that is, a layer that is spaced from the surface with appropriate passivation or other device layers interposed between the substrate surface and the metal layer. Higher layers are advantageous to reduce capacitance coupling between the light shield and the photodiode, but this does allow for the possibility of stray light coming in from the sides.

As an alternative for bio-luminescence sensors, the opaque layer can be omitted, and instead a barrier erected so that the biological analyte can be constrained to lie within the area of the first photosensitive portion 12. The output from the second photosensitive portion therefore represents a "dark" current in the sense that no light generated by the chemical reaction between reagent and analyte is incident upon it. As a further alternative, the mechanical shield can take the form of an opaque housing for the device, which can comprise housing portions arranged to cover the relevant areas of each pixel to define the dark photosensitive portions.

Each photosensitive portion 12, 14 is connected to a reset voltage VRT via MOS switches 22, 24. These are shown as NMOS transistors for simplicity, but it is to be understood that they could be PMOS or CMOS transistors, or any other appropriate switching device. A reset switch 26 is also provided across the feedback capacitor 28 of an operational amplifier 20. The reset switch is selectively operable to discharge the operational amplifier 20.

It may be important to ensure that the photosensitive portions are as similar as possible. The criteria for this, as well as options for their physical arrangement will be discussed in more detail below.

Figure 2A:
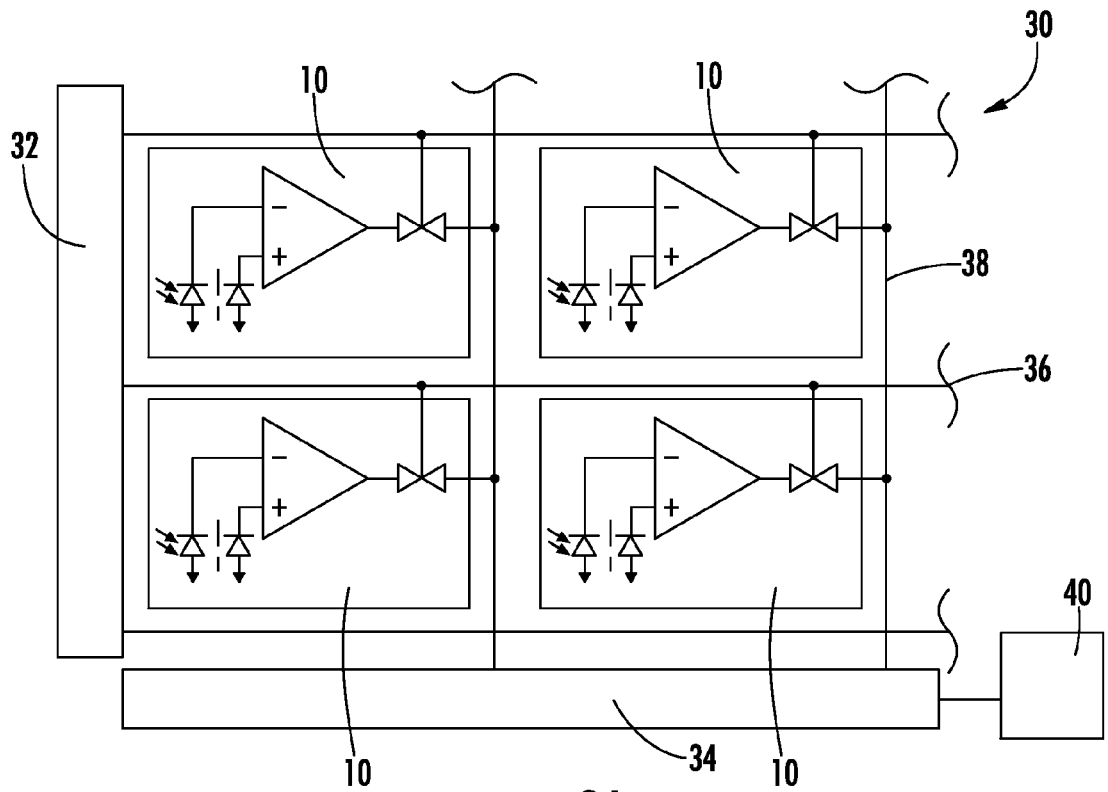
FIGS. 2a and 2b are schematic diagrams showing an image sensor comprising an array of the pixels shown in FIG. 1, with a first version shown in FIG. 2a and a second version shown in FIG. 2b.

FIG. 2a shows an image sensor architecture comprising an array 30 of pixels 10 with associated circuitry comprising horizontal and vertical shift registers 32, 34 and row and column buses 36, 38 for the transfer of outputs from the pixels. Analog to digital circuitry 40 is also provided.

Figure 2B:
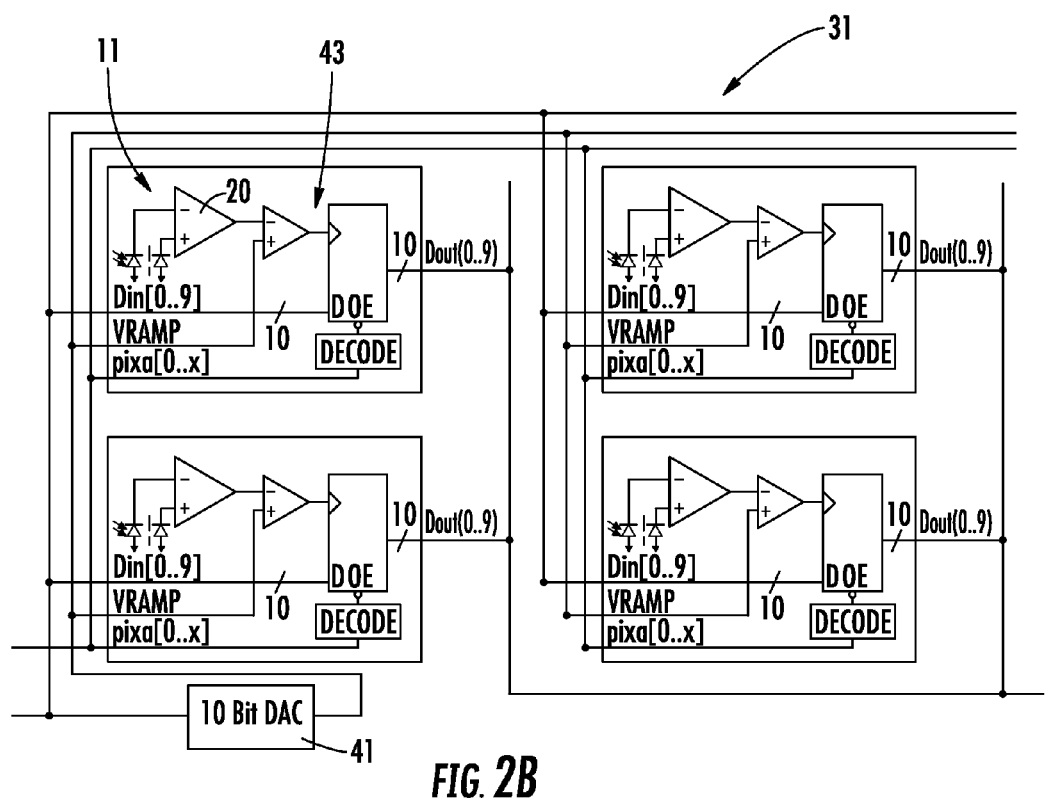

The structure shown in FIG. 1 can be provided as part of a pixel that also comprises its own analog-to-digital (ADC) circuitry. An array 31 of such pixels 11 is shown in FIG. 2b. The output of a global digital-to-analog converter (DAC) 41 is fed to the pixels to generate a ramp voltage VRAMP which is compared with the output from operational amplifier 20 by ADC circuitry shown generally at 43 provided for each pixel 11.

Figure 3:
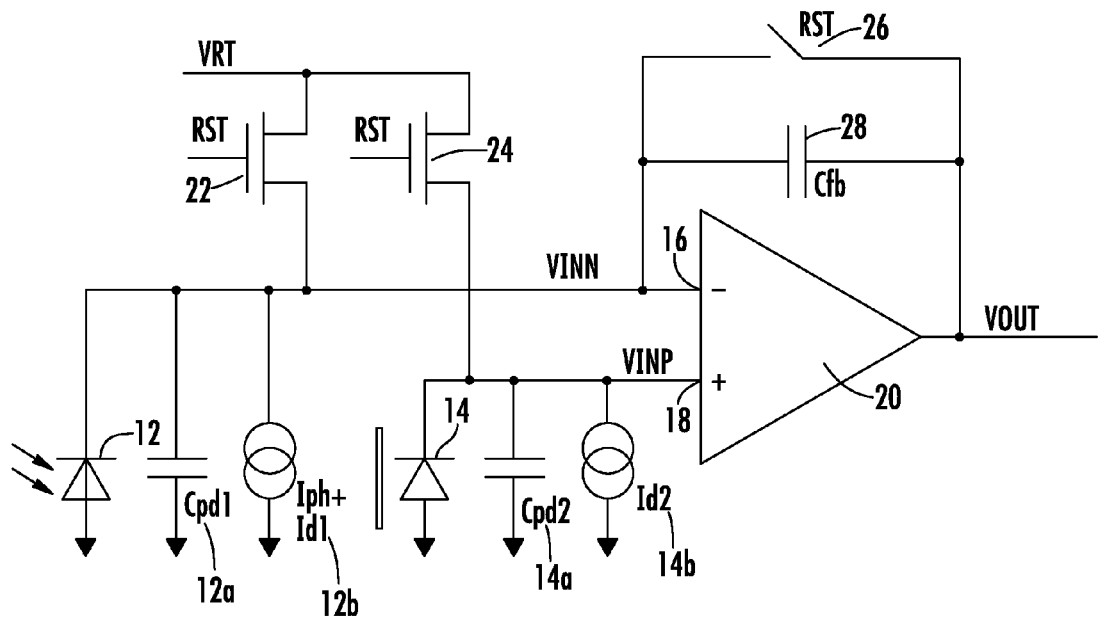
FIG. 3 is a schematic diagram showing the same pixel shown in FIG. 1 with further detail regarding the photosensitive portions.

The operation of the pixel 10 can be seen more clearly by examining FIG. 3. This is similar to FIG. 1, so the same reference numerals are used, except that the photosensitive portions 12 and 14 have been modeled showing their intrinsic capacitances Cpd1 (12a), Cpd2 (14a) and current sources 12b, 14b. For the first photosensitive portion 12 the current source is $i_{ph}$ plus $I_{d1}$ where $I_{ph}$ is the photo current and $I_{d1}$ is the dark current through the photodiode. For the second photosensitive portion 14 the current source comprises only $I_{d2}$, i.e. the dark current through the second photosensitive portion 14.

Assuming the system has been reset, dark current will cause the voltage on VINP to decay:

$$VINP = VRT - I_{d2} \times \delta t / C_{pd2} \quad \text{(Equation 1)}$$

The operational amplifier offers high impedance, and so no current flows into its input. Hence:

$$Q_{Cfb} = (I_{d1} + I_{ph}) \times \delta t \quad \text{(Equation 2)}$$

Hence the voltage at the output of the op-amp, $VOUT = VINN + Q_{Cfb}/C_{fb}$. Due to the negative feedback operation of the op-amp, VINN=VINP and so:

$$VOUT = VINP + Q_{Cfb}/C_{fb} \quad \text{(Equation 3)}$$

Substituting Equation 1 and Equation 2 into Equation 3, we get $VOUT = (VRT - (I_{d2} \times \delta t/C_{pd2}) \;\; (I_{d1} + I_{ph}) \times \delta t / C_{fb}$, which when rearranged gives:

$$VOUT = VRT + I_{ph} \times \delta t / C_{fb} + (I_{d1}/C_{fb} - I_{d2}/C_{pd2}) \times \delta t \quad \text{(Equation 4)}$$

From Equation 4, it can be seen that as a general case, the effect of dark current can be cancelled in the output voltage if:

$$I_{d1}/C_{fb} = I_{d2}/C_{pd2} \quad \text{(Equation 5)}$$

As a special case, equation 5 will be satisfied and the effect of dark current can be cancelled if:

$$I_{d1} = I_{d2} \text{ AND } C_{fb} = C_{pd2} \quad \text{(Equation 6)}$$

From the above we can see that in a general case dark current will be cancelled when the ratio of the dark current in the first photosensitive portion 12 to the feedback capacitance 28 of the operational amplifier 20 is equal to the ratio of the dark current in the second photosensitive portion 14 to the intrinsic capacitance 14a of that photosensitive portion 14. As a special case, the dark current will be cancelled in the output voltage if the dark current in each photosensitive portion 12,14 is equal AND if the intrinsic capacitance of the second photosensitive portion 14 is equal to the feedback capacitance 28 of the operational amplifier 20.

In addition, the operational amplifier 20 can be designed with a high input common mode rejection ratio so signals which appear on both outputs are ignored. This means that any noise on the ground is ignored and does not appear at the output.

Given this analysis there are a number of design options for cancelling the dark current. The first of these is to make the photosensitive portions 12,14 identical and set the feedback capacitance 28 to match the capacitance of the diodes (assuming $C_{pd1} = C_{pd2}$). Techniques for ensuring that the diodes match will be discussed below.

However, dark current is very sensitive to the precise doping levels and profile and it is actually common for there to be a variation even between pixels in an array. A further complication arises from the different structures of the capacitances $C_{pd2}$ and $C_{fb}$. The photosensitive portion's capacitance $C_{pd2}$ is formed from a P-N junction while the feedback capacitance $C_{fb}$ is formed typically by a metal-to-metal or polysilicon-to-polysilicon capacitor. Because these structures are different it is difficult to match their design precisely. It is not practical to use a P-N junction for $C_{fb}$ as a P-N junction capacitor has one side at ground (or VDD) and the operational amplifier requires that both sides of Cfb are floating, i.e. not connected to a power rail.

Figure 4:
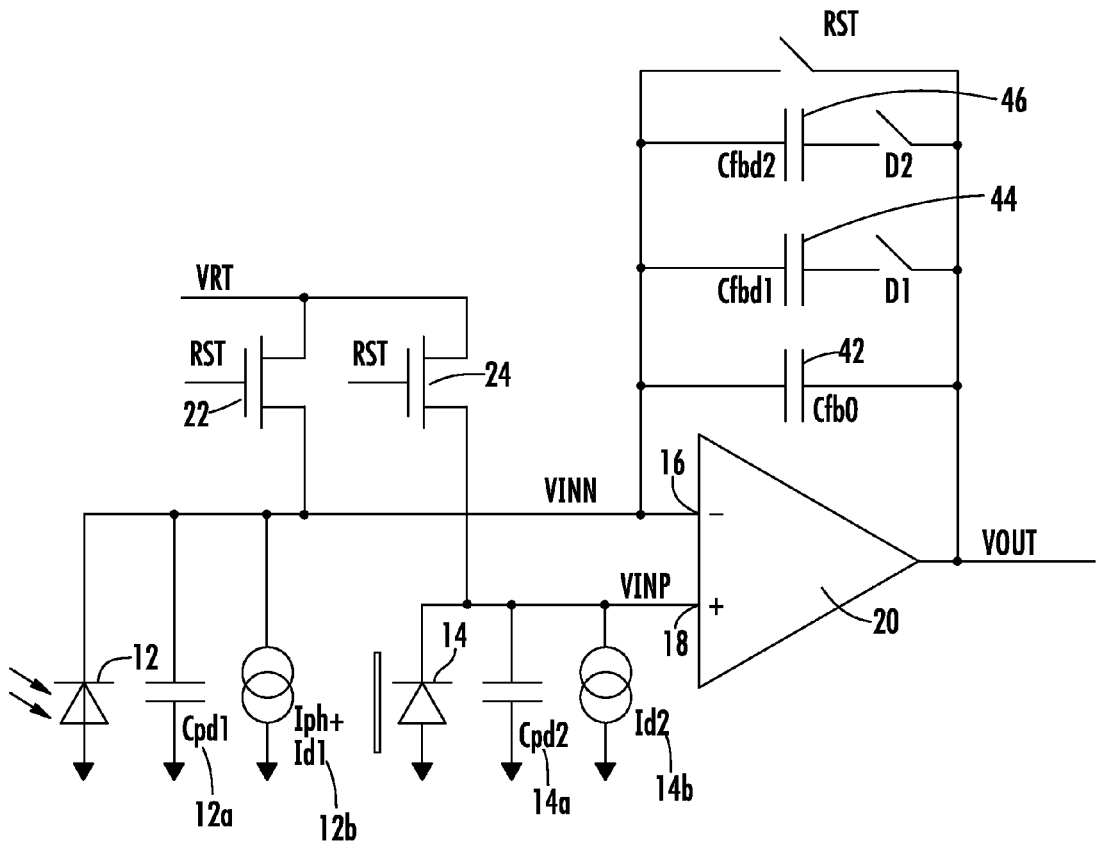
FIG. 4 is a schematic diagram showing a pixel according to a second embodiment.

We can see from Equation 5 that if the dark currents $I_{d1}$ and $I_{d2}$ do not match, the dark current can still be cancelled so long as the ratios $I_{d1}:C_{fb}$ and $I_{d2}:C_{pd2}$ are equal. FIG. 4 shows an embodiment of a pixel that has a means for varying the feedback capacitance $C_{fb}$ to maintain this equality in the event of differences between $I_{d1}$ and $I_{d2}$. Again, the same reference numerals as previously used will be re-applied where appropriate.

Instead of designing $C_{fb}$ to be simply a single capacitance of equal value to $C_{pd2}$, a plurality of "ladder" capacitors 42-46 are connected in parallel across the operational amplifier 20. A base feedback capacitor $C_{fb0}$ (42) is connected across the amplifier 20, while the ladder capacitors $C_{fbd1}$, $C_{fbd2}$ (44,46) are selectively connectable across the amplifier 20 via switches D1, D2 as shown (the "d" in the labels here stands for a given difference, δ, in capacitance). The base capacitor $C_{fb0}$ has a value less than that of $C_{pd2}$. It is to be understood that any number of ladder capacitors can be provided, the illustrated example only shows two for the purposes of illustration only. Any number of the other capacitors 44,46 can be connected in any combination.

In one implementation option $C_{fbd1}=C_{fbd2}$ and $C_{fbd1}+C_{fb0}=Cfb=C_{pd2}$. Hence if the dark current in $i_{d1}$ is slightly greater than $I_{d2}$ (i.e. $I_{d1}=I_{d2}+\delta I_{dark}$), then to maintain $I_{d1}/C_{fb}=I_{d2}/C_{pd2}$, $C_{fb}$ must be smaller than $C_{pd2}$. This is achieved by leaving both switches D1 and D2 open, so that the feedback capacitance is provided by $C_{fb0}$ only, which is smaller than $C_{pd2}$.

If the two dark currents are the same (i.e. $I_{d1}=I_{d2}$), then D1 is closed and D2 is open. The resultant feedback capacitance across the amplifier 20 is then $C_{fb}=C_{fb0}+C_{fbd1}=C_{pd2}$. If the dark current in $I_{d1}$ is slightly less than $I_{d2}$ (i.e. $I_{d1}=I_{d2}-\delta I_{dark}$) then to maintain $I_{d1}/C_{fb}=I_{d2}/C_{pd2}$, $C_{fb}$ must be larger than $C_{pd2}$. This is achieved by closing both switches D1 and D2, so that the feedback capacitance is provided by $C_{fb0}+C_{fbd1}+C_{fbd2}$. The method can also be applied in the case where the dark currents $I_{d1}$ and $I_{d2}$ are identical, to allow for small mismatches between $C_{pd2}$ and $C_{fb0}$.

In one embodiment, each ladder capacitors has the same value, so that the applied feedback capacitance can be incremented by a step value. The number of ladder capacitors can be increased to increase the range and/or the resolution of variation that can be accommodated. As a modification, the values of the ladder capacitors can vary from each other to give any chosen flexibility in modifying the feedback capacitance value. One preferred option in this regard is to introduce a binary exponential ratio of sizes which reduces the number of switches required. For example, one could use a capacitor of size Cfb0, and then have multiples of two, four, eight and sixteen times Cfbd0 to provide an effective feedback capacitance value between Cfb0 and Cfb0+31Cfbd0.

The determination of the dark current imbalance is not known in advance and a calibration phase can be performed for its determination. This can be done as a post fabrication test of the device as performed during manufacture and the configuration of the switches can be stored in a memory such as a PROM (provided either on or off the image sensor chip). Alternatively, the calibration may be performed "on-the-fly" just before operation of the device as preparation of image capture. This takes into account different temperatures of operation of the image sensor.

The pixel output VOUT can be measured by any suitable technique, for example by an analog to digital converter, or using the system in a "light-to-frequency" type of operation where the VOUT voltage is compared to a reference signal and when it reaches this pixel is reset. The output is then given by the frequency of the reset pulses.

It is important for the cancellation of dark current that the first photosensitive portion and the second photosensitive portion are matched, in the sense that they generate the same dark current. Ideally, the dark currents will be identical, but as discussed above even if identical photosensitive portions are fabricated, the dark current between them can still vary due to manufacturing and operational factors. In practice, the respective dark currents of the photosensitive portions will always be different. True equality cannot be achieved, when analyzed to very great accuracy. The realistic goal is therefore how to minimize this difference.

One pixel embodiment described above provides a plurality of capacitors connected in parallel across the operational amplifier for canceling the variation of the dark current. However, the resolution of this system is limited by the number and size of capacitors that are included. Even a complex system of this type would benefit if the difference between the dark currents of the two photosensitive portions was less to start off with, as of course would the more simple system described above that does not include the capacitor "ladder".

Figure 5:
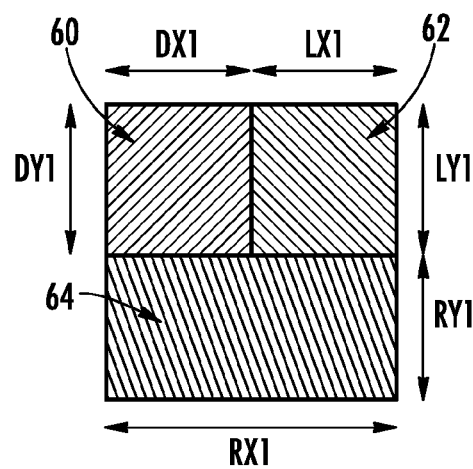
FIG. 5 is a schematic diagram showing a first pixel layout style.

Applicants have realized that the dark current is influenced by the chosen geometry of the pixel, and the effects of this will now be discussed. FIG. 5 shows a first implementation where a dark photosensitive portion 60 is provided at the top left corner adjacent to a light photosensitive portion 62 which is provided at the top right hand corner. The readout electronics 64 are provided underneath both of these portions 60,62.

Figure 6:
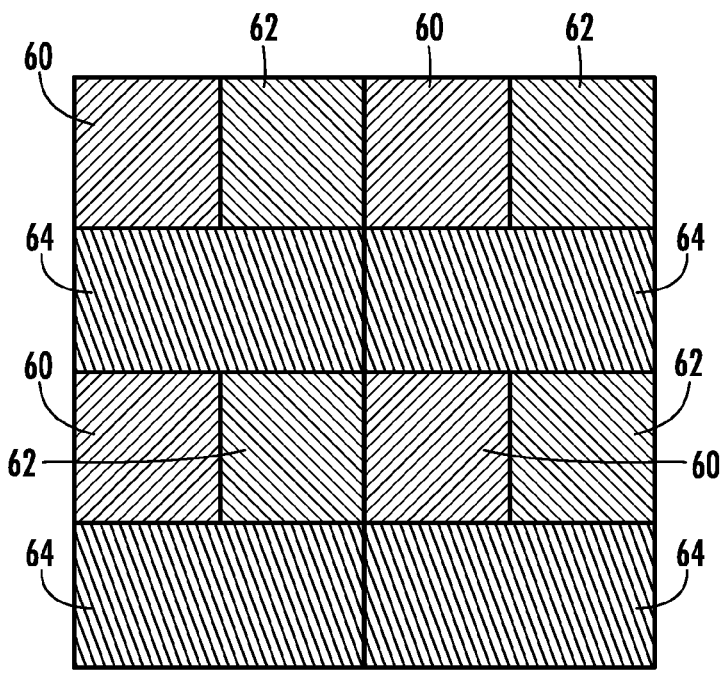
FIG. 6 is a schematic diagram showing an array of the layout style shown in FIG. 5.

As the photodiodes need to be matched, the height and width of the respective photosensitive portions 60,62 can be set equal (DX1=LX1 and DY1=LY1) in which case RX1=DX1+LX1. The size of RY1 depends on the precise layout of the readout electronics 64, but it is convenient to make it equal to both DY1 and LY1 resulting in a square shaped cell, which can be arrayed as shown in FIG. 6. In one embodiment, the shielding is formed as an opaque layer, suitably metal. This can be patterned or etched through the adaptation of known processes. It is to be noted that the pitch of the light photosensitive portions 62 is the same as the cell as a whole and if the cell is square, then the area of light photosensitive portion 62 will be one quarter of the total area of the pixel.

Figure 7:
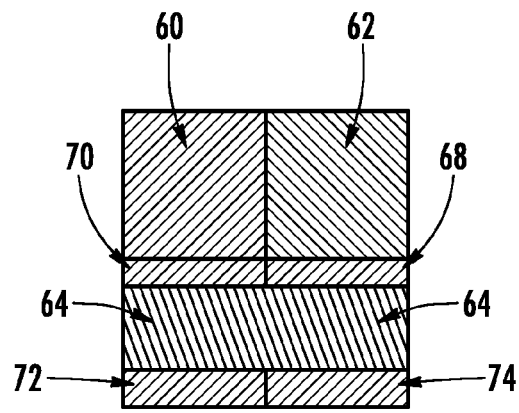
FIG. 7 is a schematic diagram showing a further modification to the pixel layout style shown in FIG. 5.

As can be seen in FIG. 6, the light photosensitive portions 62 and the dark photosensitive portions 60 are interleaved. These can be implemented with the same design and therefore deemed to match. However, vertically, the readout electronics 64 is substantially different to the photosensitive portions 60,62 and may be a source of unwanted electrons which contribute to the dark current of the photosensitive portions 60,62. Furthermore, the readout electronics 64 will have potentials higher than the photosensitive portions 60,62 thus acting as an attractor to any photogenerated electrons that may be diffusing through the substrate. This attraction reads to the recombination of the photogenerated carriers and a corresponding loss of sensitivity. An approach is to add guard rings 68, 70, 72, 74 between the photosensitive portions 60,62 and the readout electronics 64 as shown in FIG. 7. For example, the guard rings 68-74 can comprise a P+/P-well at ground and an N+/N-well at positive potential. Guard rings can be applied to this structure or to any other chosen structure which follows, although they will not be specifically illustrated from hereon in for ease of illustration.

The array shown in FIG. 6 incorporates some "dead space" between adjacent photo sensitive portions and this can be problematic in some instances. For example, if a robotic system is used to deposit chemicals on a biosensor, a positional error in the robotic system will cause a part of the bioluminescent material to be deposited outside the light sensing area and so a loss of photons or signal may result.

As a further example, if the pixel is part of a image sensing system comprising a microfluidic delivery system, there is usually an advantage in having the photodetection sites as close to each other as possible to aid delivery of the fluids. An ideal case would have zero space in both X and Y directions between light sensing elements. However, a useful compromise is having zero space in one axis, allowing the photosensitive area to occupy an almost continuous line.

Figure 8:
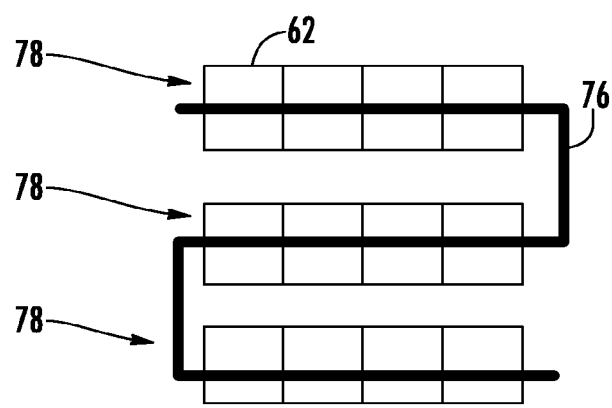
FIG. 8 is a schematic diagram showing an array of the photosensing parts of a pixel in alignment with a micro fluidic delivery system.
Figure 9:
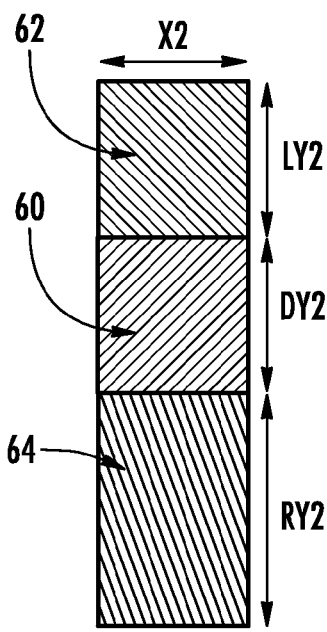
FIG. 9 is a schematic diagram showing a second pixel layout.
Figure 10:
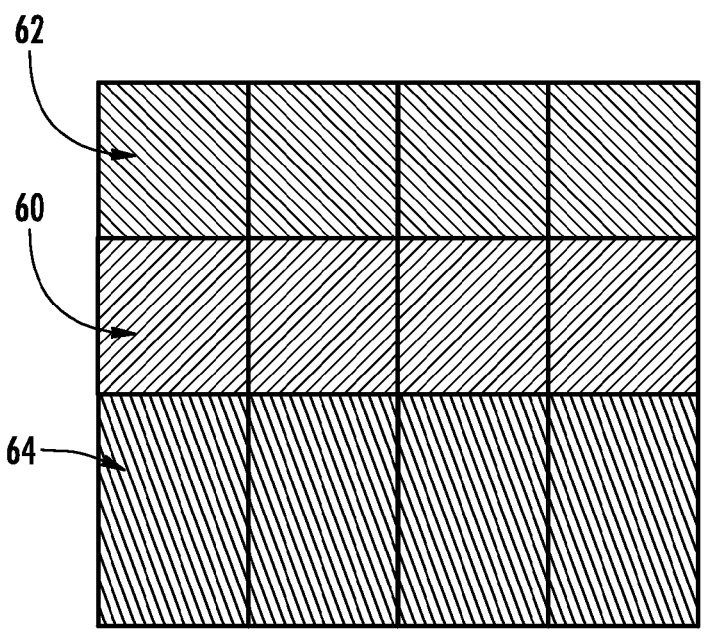
FIG. 10 is a schematic diagram showing a linear array of the pixel of FIG. 9.

An example of how this could be useful is the serpentine microfluidic path illustrated in FIG. 8, which shows the path 76 of a micro-fluidic delivery system overlaying successive rows 78 of light sensitive portions 62. A corresponding pixel layout and array are shown in FIGS. 9 and 10 in which the pixel components are stacked vertically (as shown on the page). FIG. 10 shows a linear array, but it is of course possible that several rows of linear arrays be implemented on a single substrate as for example shown in FIG. 11.

Figure 11:
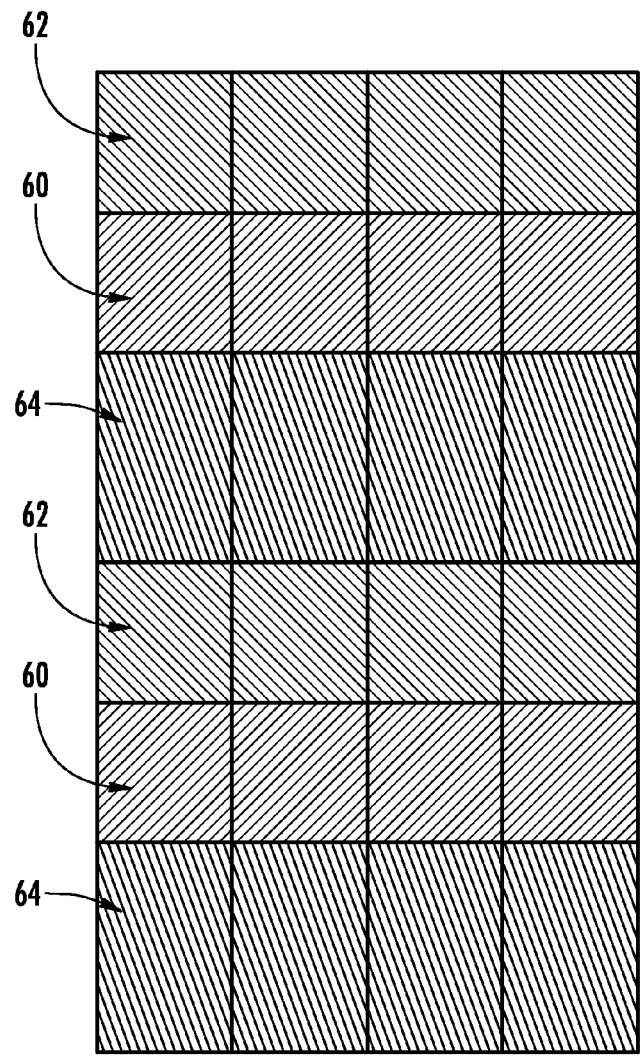
FIG. 11 is a schematic diagram showing a two dimensional array of the pixel shown in FIG. 9.
Figure 12:
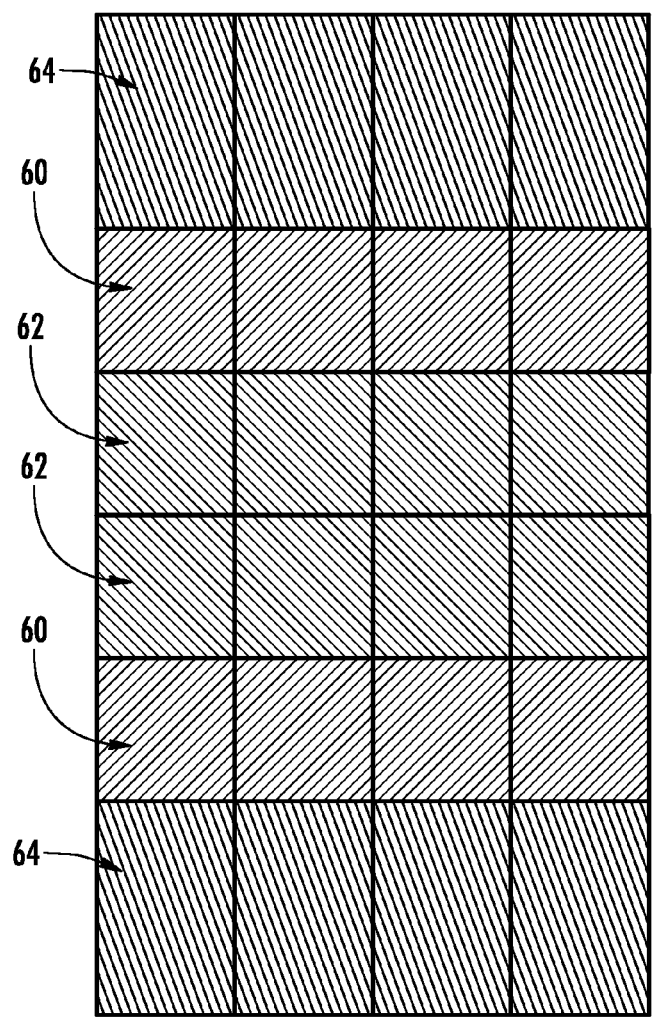
FIG. 12 is a schematic diagram showing a modified array with a first row of pixels according to FIG. 9 and a second row of pixels which are inverted with respect to the layout shown in FIG. 9.

In the array of FIG. 11, the pixels are all laid out in the same orientation. FIG. 12 shows a modified array, wherein the pixels are vertically inverted such that two rows of light sensitive portions 62 are adjacent each other. This arrangement is particularly useful if a wider photosensing array is required, for example, to compensate for positional errors of mechanical positioning of the chemicals in a bioluminescence sensor.

Figure 13:
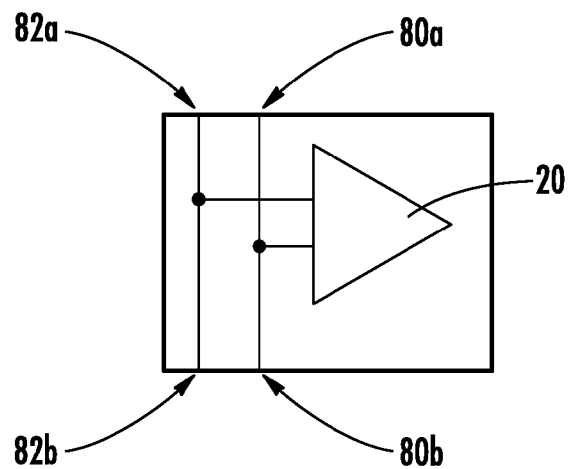
FIG. 13 is a schematic diagram showing a modified readout scheme.
Figure 14:
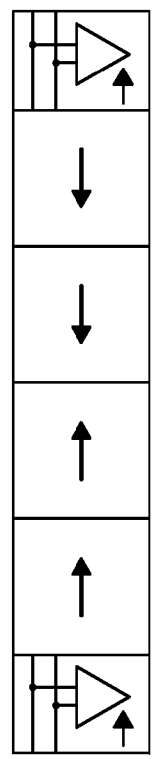
FIG. 14 is a schematic diagram showing the implementation of a modified readout scheme as used in the array of FIG. 12.

In its most simple form the layout of FIG. 12 involves the entire inversion of the pixel including the readout electronics 64. However this may be undesirable as the matching between different rows may be reduced by the different orientation of the readout electronics 64. Manufacturing variations such as doping profiles, etching gradients and so on will have different effects, which depend on the orientation of the layout of the components. FIG. 13 shows a readout electronics 64 layout for mitigating this problem. The operational amplifier 20 is provided with two connection ports (80a, 80b and 82a, 82b) for each signal to be input. The ports are aligned vertically and so the readout block can be placed in its native orientation at either the top or bottom of the stacked photosensitive portions 60,62. This is illustrated in FIG. 14, where the orientation of each component is as illustrated by the arrows. It is to be understood that the readout electronics scheme of FIG. 13, where two ports are provided for each input of an operational amplifier, a first port being at a top portion and a second port being at a bottom portion, is applicable to any pixel architecture and provides for flexibility in pixel design, as described in this patent application or elsewhere.

Figure 15:
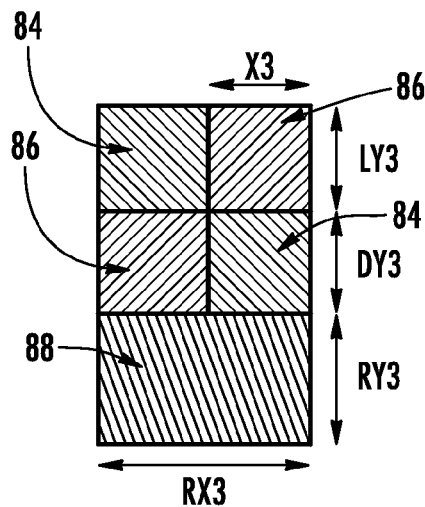
FIG. 15 is a schematic diagram showing a third pixel layout.

A further alternative pixel layout is the "common centroid" photosensitive portion arrangement as shown in FIG. 15. A light photosensitive portion is split into two diagonally opposed sub-portions 86 while a dark photosensitive portion is split into two diagonally opposed sub-portions 84. Readout electronics are shown at 88. For matching purposes the sub-portions can be formed so that they all have the same size and shape. Also for matching it can be advantageously arranged that RX3=2X3 and LY3=DY3 so that each of the sub-portions are square. The height RY3 of the readout electronics 88 is dependent on the implementation. As noted above, a guard ring (not shown) can also be optionally provided.

Figure 16:
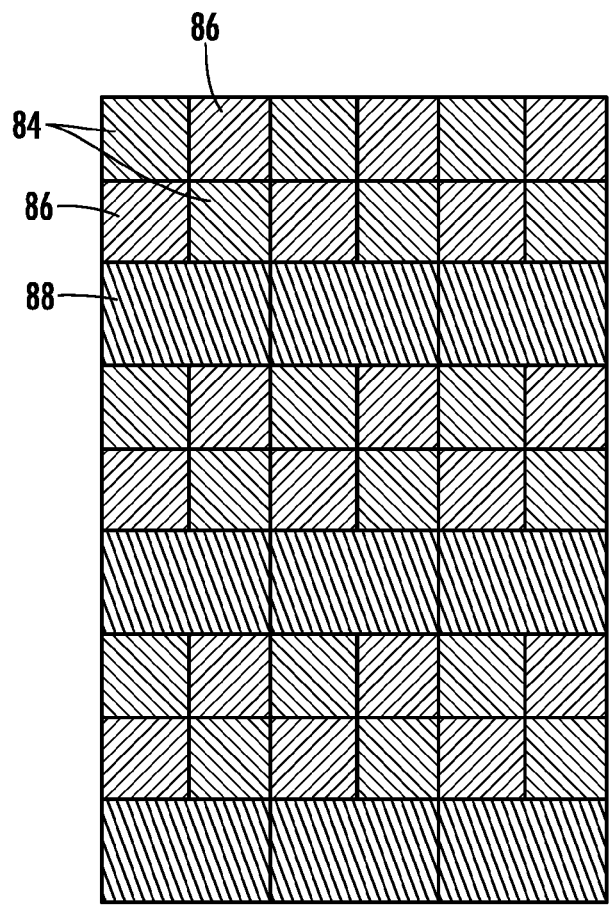
FIG. 16 is a schematic diagram showing an array of pixels according to the layout of FIG. 15.
Figure 17:
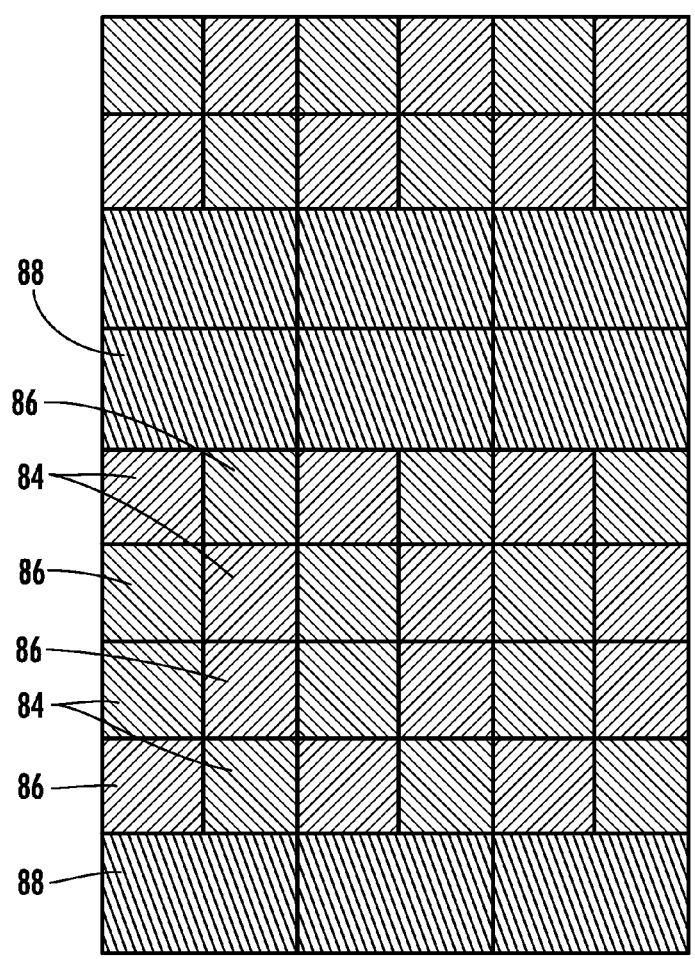
FIG. 17 is a schematic diagram showing an array of pixels according to the layout of FIG. 15 in which alternate rows are inverted.

As an alternative, the sub-portions can be formed from different sized rectangles, chosen such that the overall pixel shape is square rather than rectangular. The dark current will be considered matched provided that sum of the areas of the dark sub-portions 84 is equal to the sum of the areas of the light sub-portions 86. FIG. 16 shows an array of the pixels shown in FIG. 15, where the orientation of all pixels is the same, while FIG. 17 shows an array of the pixels which are inverted in a similar fashion as discussed above, optionally with the readout electronics 88 being provided in the form shown in FIG. 13.

Note however, that while this implementation provides good matching, the photosensitive portions 84,86 are relatively spread out (compare FIGS. 12 and 17), which effectively reduces the sensitivity of the pixel as fifty percent of the photosensing area (where the light photosensitive portions of successive pixels are located) is shielded from light. Furthermore, because the shielded area is interleaved with the light sensing area, it can be difficult to place the biological reagent solely at the light photosensitive portions. It can be placed over the entire area if required, although this is wasteful of materials.

Figure 18:
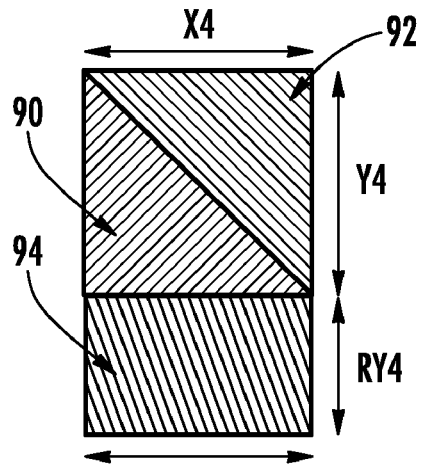
FIG. 18 is a schematic diagram showing a fourth pixel layout.
Figure 19:
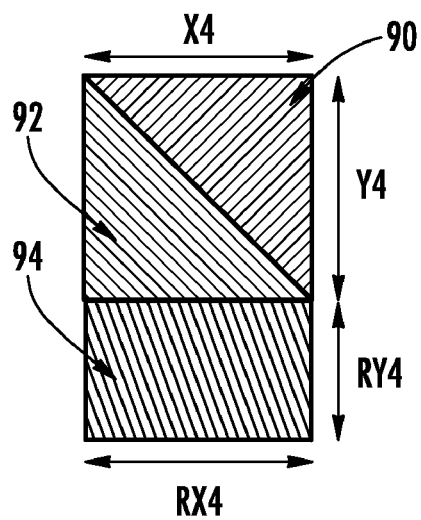
FIG. 19 is a schematic diagram showing a fifth pixel layout.

Further layout options that help ameliorate these disadvantages is shown in FIGS. 18 and 19. In some process technologies the sides of polygons must be orthogonal, however in most process technologies polygon angles at 45° are permitted. FIG. 18 shows a first embodiment where a dark photosensitive portion 90 is provided next to readout electronics 94, with the remainder of the pixel forming a light photosensitive portion 92. FIG. 19 shows an alternative embodiment where the light photosensitive part 92 is adjacent to the readout electronics 94.

Figure 20:
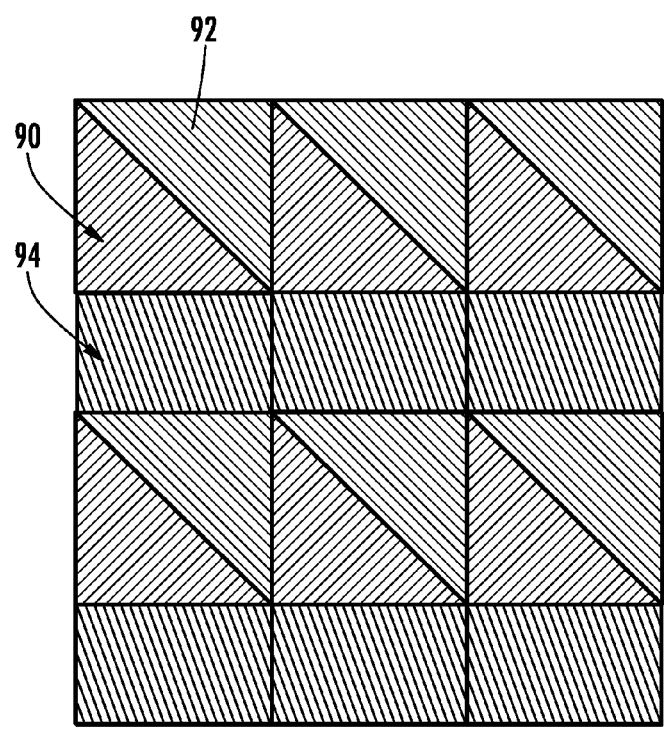
FIG. 20 is a schematic diagram showing an array of pixels which have the fourth layout shown in FIG. 18.
Figure 21:
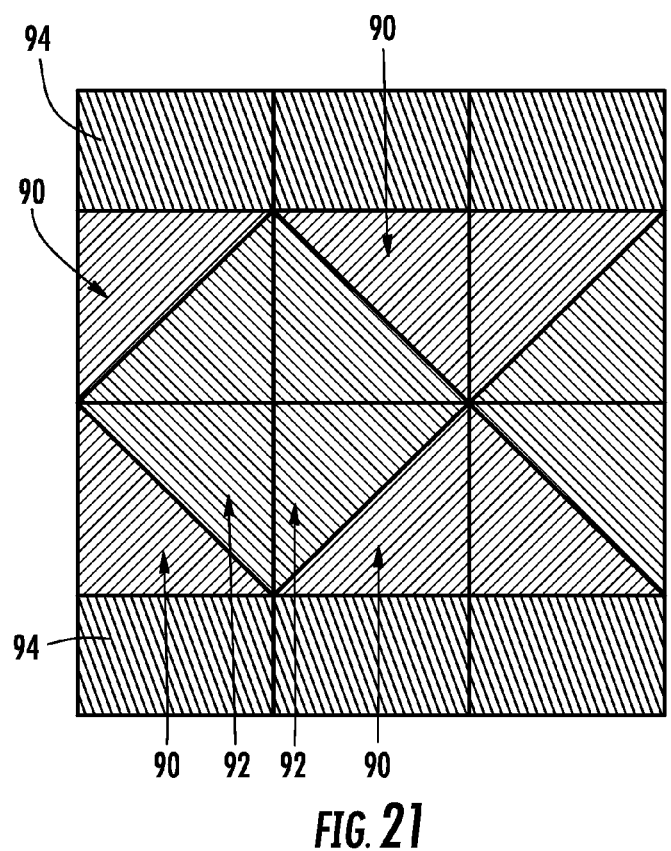
FIG. 21 a schematic diagram showing an alternative array of pixels which have the fourth layout shown in FIG. 18.

Again, there are various way of producing arrays with the pixels shown in FIGS. 18 and 19. Two possible layouts for arrays of the pixels shown in FIG. 18 are shown in FIGS. 20 and 21. As can be seen in FIG. 21, the inversion of alternate cells results in both horizontal and vertical directions as appropriate results in light photosensitive portions 92 which are adjacent to and facing each other. This simplifies the deposition of biological chemicals in the case of a bioluminescence sensor. It also provides larger effective light sensitive areas, because the readings from multiple pixels having adjacent and facing light photosensitive portions 92 can be combined to give a representation of a signal gathered by the combined light sensitive area.

Figure 22:
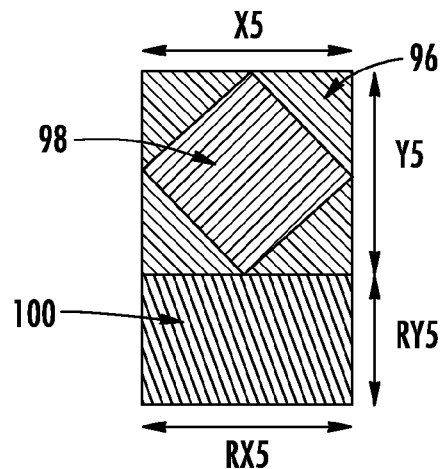
FIG. 22 is a schematic diagram showing a fifth pixel layout.
Figure 23:
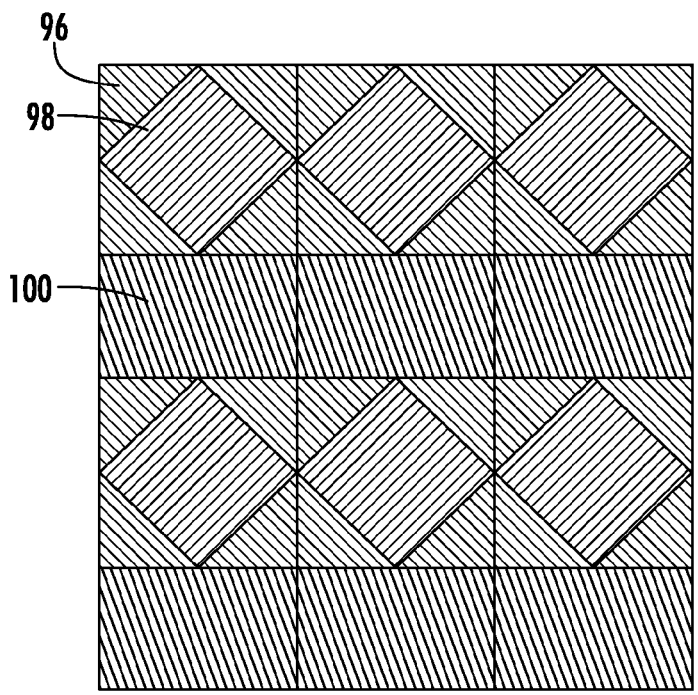
FIG. 23 is a schematic diagram showing an array of the pixels of FIG. 22.
Figure 24:
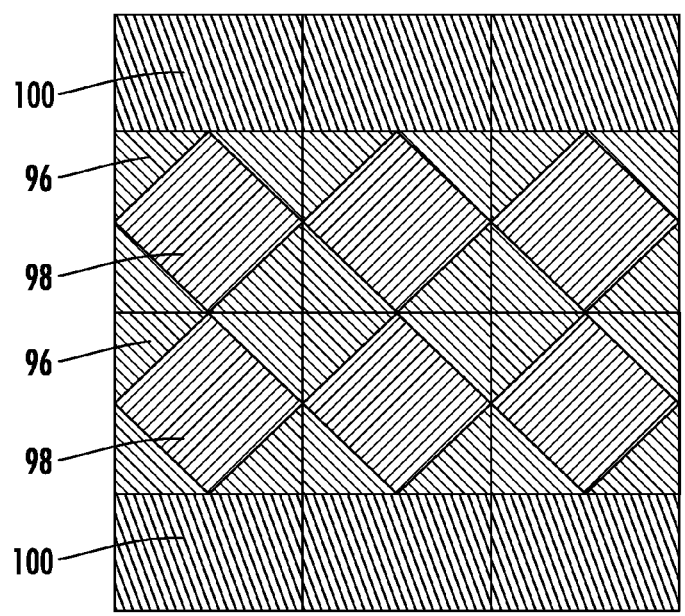
FIG. 24 is a schematic diagram showing an array of the pixel of FIG. 22 comprising a first row in normal layout and a second row in which the pixel has been vertically inverted.

A further possible layout option is shown in FIGS. 22-24. The light photosensitive portion 98 is substantially surrounded by a dark photosensitive portion 96 having the same surface area. Again, readout electronics 100 are provided, and for matching the distances X5 and RY5 are advantageously equal. The distance RY5 depends on the implementation of the readout electronics 100. FIGS. 23 and 24 illustrate examples of how this pixel can be arrayed, with common orientation and with vertical inversion respectively.

The pixels described with respect to FIGS. 5-24 are all designed using the assumption that the photosensitive portions are defined by their implant boundaries, that is, the N-well boundary defines the collection area. In that case, the requirement for matching between the first photosensitive portion and the second photosensitive portion means that the areas of the two photosensitive portions must be equal.

However, Applicants have realized a case where the areas do not have to be equal while still ensuring that the first and second photosensitive portions are matched, i.e. provide the same dark current.

Figure 25:
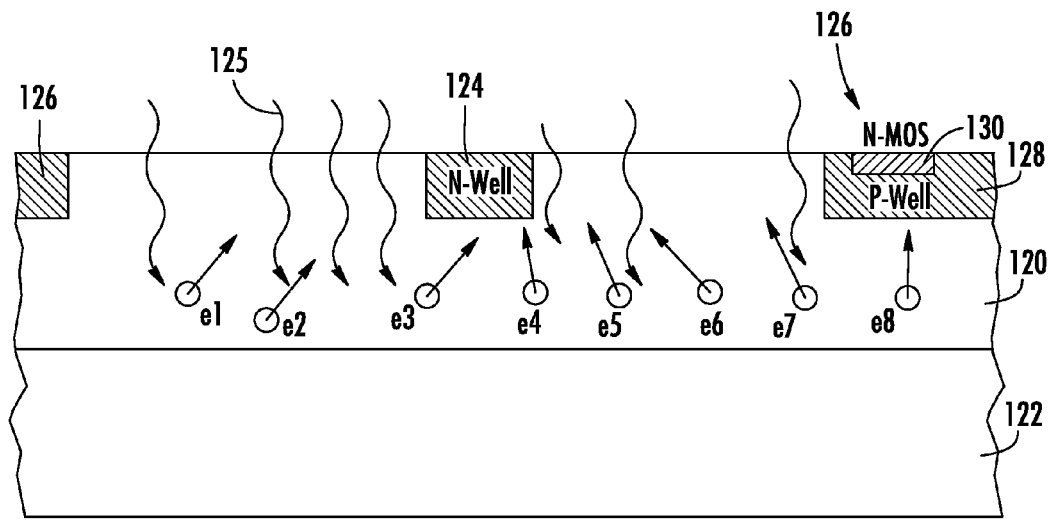
FIG. 25 is a schematic sectional view showing a further alternative structure for a pixel photosensitive portion.

U.S. Pat. No. 6,998,659 discloses a non-standard pixel structure, and the contents of this patent are herein incorporated by reference. A first version of this pixel structure is shown in FIG. 25. A P-epitaxial layer 120 is formed on a P substrate 122. A photosensitive portion is formed as an N-well island 124 which collects electrons $e_n$ photogenerated by incident radiation 125, and the pixel's readout electronics 126 comprise a P-well 128 in which NMOS transistor 130 is located. In conventional pixels, the N-well 124 would extend the entire length between the readout electronics 126 of successive pixels, but in the pixel of FIG. 25, the N-well 124 is provided as an island, that is, it is surrounded by P-epitaxial material which is very lightly doped in comparison with the P-wells 128, and is not connected to ground. The smaller size of the N-well 124 means that the capacitance of the photosensitive portion is relatively small. At the same time, collection efficiency is not compromised. The majority of electrons, such as e1-e6 as shown in FIG. 25, will diffuse in the epitaxial layer 10 and ultimately be collected by the N-well 124. Electron e7 may find its way either to the N-well 124 or to the P-well 128. Electron e8 will most likely find its way to the P-well 128 and be lost.

Figure 26:
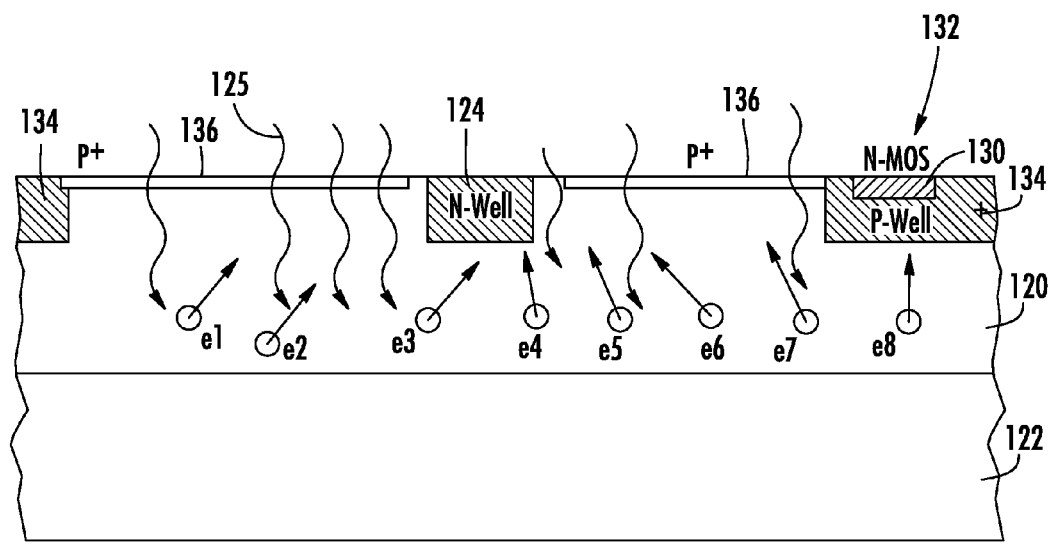
FIG. 26 is a schematic sectional view showing a modification that can be made to the structure shown in FIG. 25.

A modification is shown in FIG. 26, in which the readout electronics 132 comprises a thin layer 136 of P+ material placed over the majority of the pixel's surface, so that the surface of the epitaxial layer around the N-well 124 is covered, except for a narrow zone around the N-well 124. The layer 136 extends from the P-well 134 and hence is electrically connected to it. The P-well 134 is usually at ground potential, and so therefore is the layer 136. The layer 136 is at a lower implant depth and at a lower potential than the N-well collection node 124, and thus the electrons are more likely to go towards the N-well 124 and be collected. For example, electron e7 in FIG. 26 is more likely to go to the N-well 124, while in FIG. 25 is it quite likely to go to the P-well 128 and be lost.

For larger pixels, more than one N-well island (or "collection node") can be provided. The distance that the electrons will diffuse before recombining is called the recombination length, and this parameter is determined primarily by the level of substrate doping and secondly by the substrate defectivity. The higher the doping, the shorter the recombination length. The recombination length therefore defines a maximum spacing for the collection nodes. With typical substrates having a resistivity of 10 Ω/cm, the recombination length is typically 30 μm-50 μm. Hence, it is practical to space collection nodes with this distance and still get good collection of the photogenerated charge. It is also to be appreciated that the doping types (P/N) can be reversed if desired.

The size of the collection nodes is dependent on the manufacturing technology, but typically can be as small as 1 μm×1 μm. The minimum size is not recommended as normal manufacturing variations will cause a relatively large change in their size and hence characteristics. As the dark photosensitive portion needs to accurately match the light photosensitive portion, this is undesirable. Increasing the N-Well size increases both its area and perimeter, leading to an increased dark current signal and dark current noise. A good compromise for N-Well size is 5 μm-15 μm.

Figure 27:
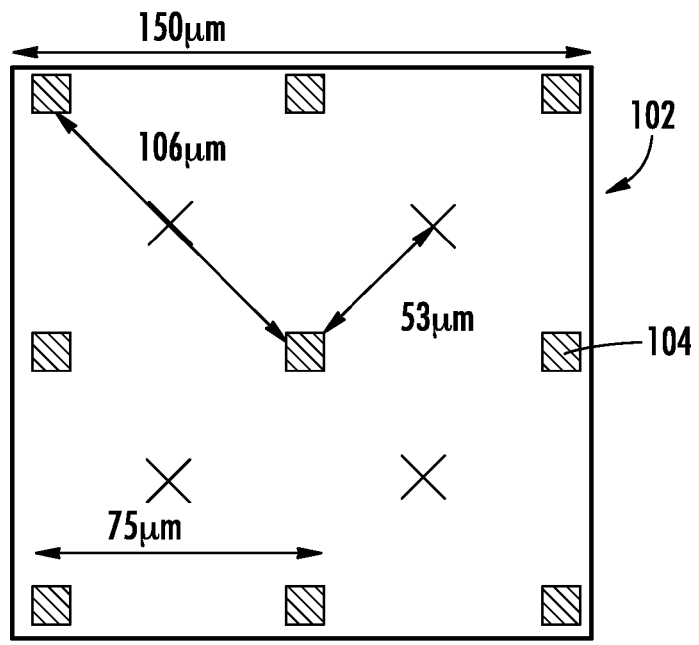
FIG. 27 is a schematic diagram showing a light photosensitive portion according to a further aspect of the invention.

FIG. 27 shows an implementation of this technique wherein a light photosensitive portion 102 is 150 μm square and comprises a plurality of collection nodes 104, in this case forming a 3×3 array. The positions where photogenerated electrons are furthest from the collection nodes are shown in FIG. 27 and are 53 μm from the center of the N-Well islands 104. The distance to the edge of the N-Well 104 will be less the exact value depends on the size of the N-Well structure 104. If the structure is 10 μm×10 μm, then the distance between the furthest point and the well boundary is reduced by approximately 7 μm. Hence, the electrons need only to diffuse 46 μm before reaching a collection node.

Figure 28:
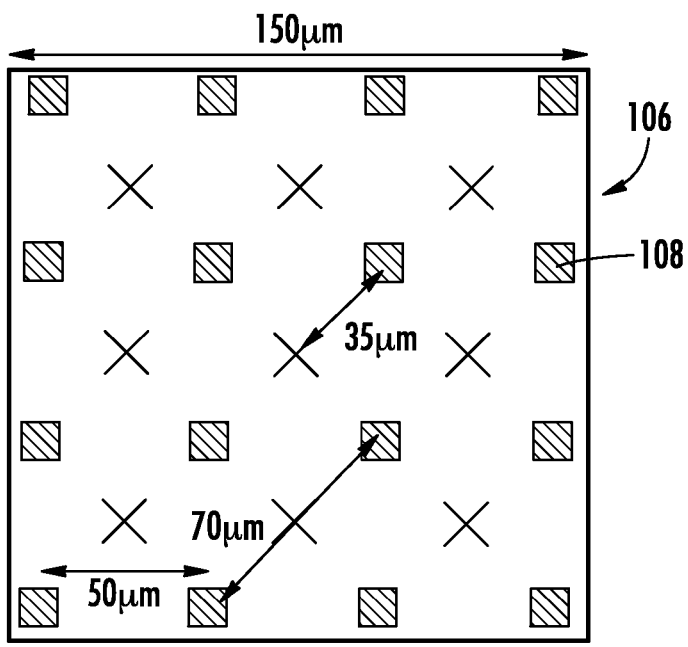
FIG. 28 is a schematic diagram showing a second embodiment of a photosensitive portion.

If the recombination length is shorter, then the number of N-Well islands 104 can be increased suitably. An example is shown in FIG. 28 in which a light photosensitive portion uses a 4×4 grid of N-well islands 108 and hence will work well even where the recombination length is 30 μm. Further increases in the number of N-wells is possible, but it is undesirable as it will increase the dark current.

The use of island photosensitive portions has advantages when we consider the construction of the dark photosensitive portion. For the light and dark photosensitive portions to match, they must generate the same dark current. This is an electrical requirement rather than a physical requirement. Using islands means that we can meet this requirement even if the size and/or shape of the dark photosensitive portion is different from the size and/or shape of the light photosensitive portion.

Figure 29:
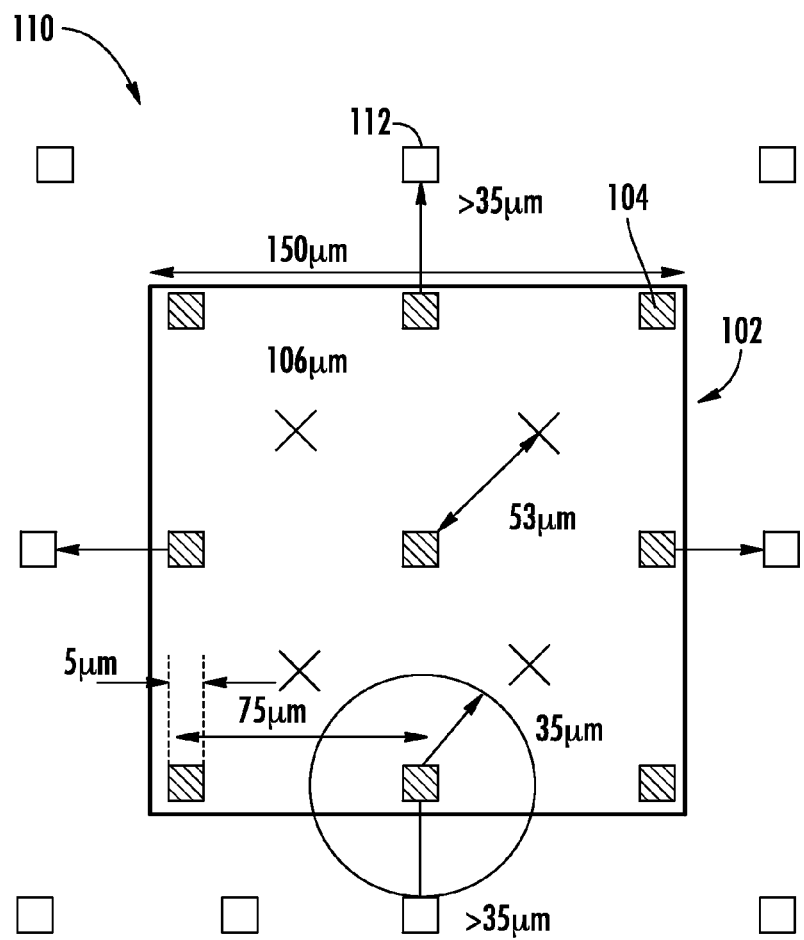
FIG. 29 is a schematic diagram showing an embodiment of a photosensitive portion with a dark photosensitive portion.

An example of this is shown in FIG. 29, where photosensitive portion 102 as shown in FIG. 27 is surrounded by a dark photosensitive portion 110 comprising a number of dark shielded N-well structures 112. The shielding is not shown in the drawing for simplicity and it is to be noted that the different shading of the N-well islands 104,112 is for clarity only, they will in practice be identical in structure, the only difference being the shielding that is applied.

The locations of the islands 112 in the dark portion must be such that they do not collect any photo generated charge, FIG. 29 shows them spaced roughly equally around the perimeter of the light photosensitive portion 102. Ideally, they will be placed a distance from the light photosensitive nodes 104 that is greater than the combination length so that any photons incident on the border of the shielding if they generate electrons. These electrons will be drawn to the N-wells in the light sensitive portion instead of the dark portion, this increases the overall size of the pixel.

The use of islands and a recognition that only the electrical characteristics need matched means that, relative to embodiments where the areas of the light and dark photosensitive portions are equal, the area of the dark photosensitive portion can be decreased. This means that the area of the light photosensitive portion can be increased, yielding a corresponding increase in the pixel's fill factor. Alternatively or additionally, additional readout circuitry can be incorporated within the same pixel area because of the relative decrease in the area of the dark photosensitive portion to increase the functionality of the pixel.

It is possible to reduce the size of the pixel further by placing the dark-shielded collection nodes 112 closer together. However, they should remain further away than the closest sensing node to deal with the worst case situation where charge is generated at the edge of the light photosensitive portion. For the example shown in FIG. 27, the edge of the N-well islands should be as close to the edge of the light shielding as practical, while ensuring that it is not inside the shielded area, and the edge of the shielded nodes should be further than the spacing light-sensing node (around 35 μm (not incl. Well size)).

As there are nine collection nodes in the light photosensitive portion 102 and the light photosensitive portion 102 has 4 sides, it is not possible to space the dark-shielded collection nodes 112 equally along the perimeter. However, having the dark-shielded nodes arranged around the entire perimeter of the light photosensitive portion 102 is advantageous as the effect of any doping gradient will be cancelled out as the "center" of the dark photosensitive portion 110 is common to the center of the light photosensitive portion 102.

It may be possible to reduce the distance between the light-sensing nodes 104 and the dark-shielded nodes 112 by using a guard ring between the two regions. This guard ring would collect any (photo-generated) carriers and remove them, so avoiding their collection by the dark-shielded node. This may reduce the area of the device, but potentially at the cost of some sensitivity, as the guard ring will absorb some photo-generated carriers near the edge of the light shield.

Figure 30:
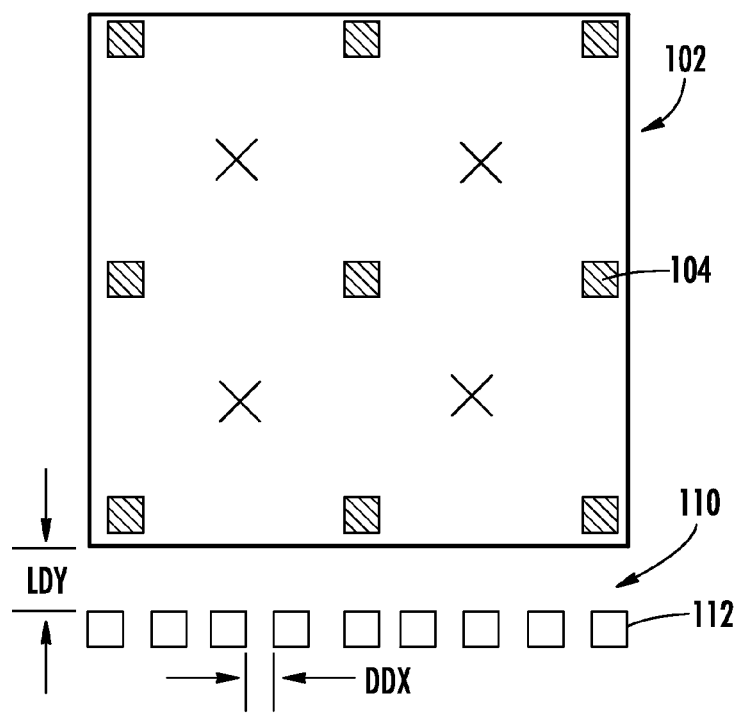
FIG. 30 is a schematic diagram showing a pixel layout where the area of the dark photosensitive portion is decreased with respect to previous figures.
Figure 31:
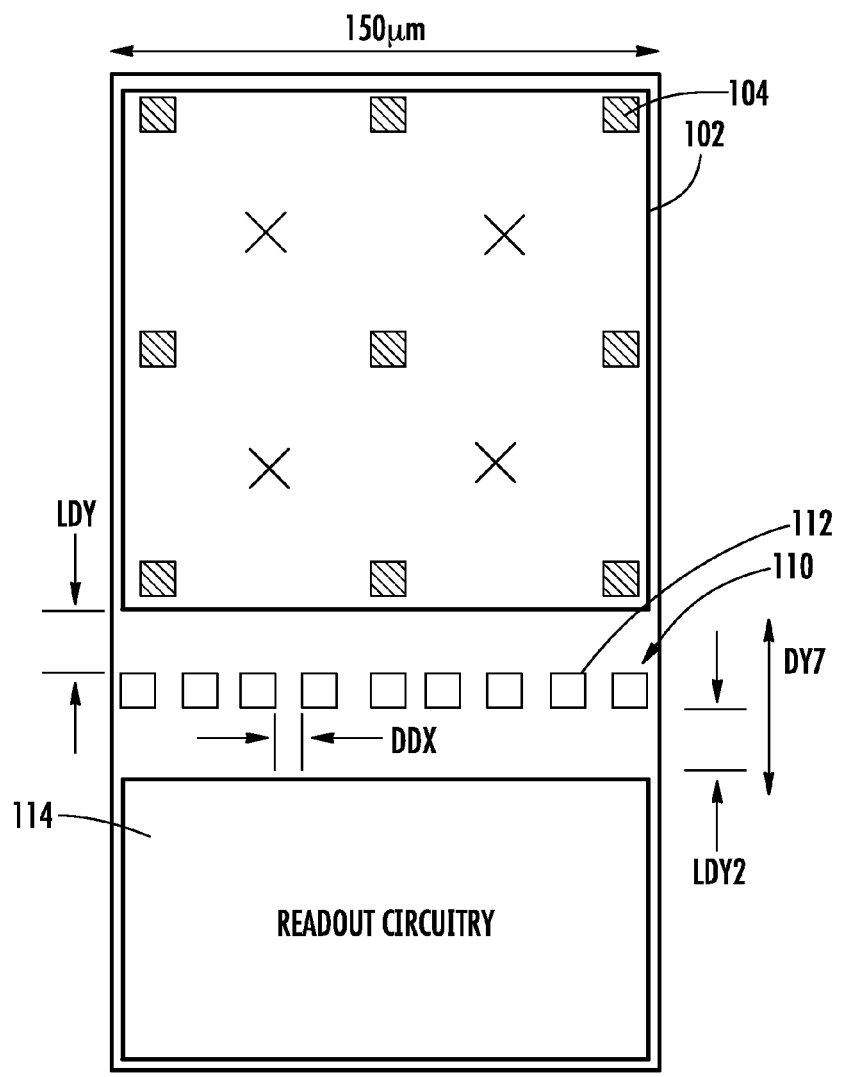
FIG. 31 is a schematic diagram showing a pixel floor plan using the photo sensitive portions of FIG. 30.

A further modification is shown in FIG. 30 with its associated pixel floor plan shown in FIG. 31. The dark-sensing nodes 112 can be placed closer to each other than they can be to the light-sensing nodes 104, but not so close that they interact with each other. This interaction comes primarily from two sources. During manufacture, the implantation of the N-Wells is somewhat dependent on their density or proximity to each other. During operation, the structures are reverse biased, producing a depletion region it is important that these depletion regions remain isolated. Hence the minimum separation for the dark-shielded nodes ("DDX" in FIG. 30) is process dependent, but 5 μm is a good estimate. The distance between the dark-shielded nodes and the light sensitive part of the pixel ("LDY" in FIG. 30) is determined in the same manner as previously described.

Similarly the distance LDY2 (FIG. 31) between the dark-shielded nodes 112 and the readout electronics 114 must be large enough to prevent any carriers from the readout circuitry 114 from diffusing into the dark-shielded nodes 112. This can be achieved either by adjusting LDY2 or by putting a guard ring (to collect the charge) between the dark-shielded nodes 112 and the readout circuitry 114. As there is no photo generated charge around, there will be no loss of signal of guard ring on the readout side of the dark-shielded nodes 112.

It is to be appreciated that the new pixels and their arrayed arrangements together with associated methods of dark current cancellation and/or image detection that are described above can be incorporated in a large number of possible end products and devices. The application of bio-luminescence sensors and associated systems for material analysis etc. has been mentioned above because for this type of sensor the ability to cancel dark current and thereby deal with lower light levels is of particular importance. However, the advantages of canceling dark current and sensing light at lower levels are universal, and the mention of the field of bio-luminescence sensor is made as an example only, with no intention for this to limit the scope of the invention. In particular, those skilled in the art will appreciate that the new pixels and their arrayed arrangements together with associated methods of dark current cancellation and/or image detection that are described above can be implemented in products including but not limited to an optical pointing device, for example an optical mouse; a camera for a mobile phone, and a mobile phone incorporating the camera; a webcam or an ambient light sensor. The skilled artisan has a working knowledge of the construction of each of these devices and the utility of the new pixel is apparent without further detailed explanation herein.

Furthermore, various improvements and modifications can be made to the above without departing from the scope of the invention.

That which is claimed is:

1. A pixel for an image sensing array of an image sensor, comprising:
   a first photosensitive portion;
   a second photosensitive portion shielded from incident light and individually associated with said first photosensitive portion of said pixel; and
   an amplifier arranged to receive a signal from the first photosensitive portion at a first input, and to receive a signal from the second photosensitive portion at a second input;
   the amplifier comprising an operational amplifier including a negative feedback loop comprising a feedback capacitance and associated switch to discharge the operational amplifier, and the feedback capacitance being based upon a capacitance of the second photosensitive portion.

2. The pixel of claim 1, wherein the negative feedback loop includes a circuit to vary the feedback capacitance applied to the operational amplifier.

3. The pixel of claim 2, wherein the circuit to vary the feedback capacitance comprises a plurality of ladder capacitors each being selectively connected in parallel across the operational amplifier.

4. The pixel of claim 3, wherein the circuit to vary the feedback capacitance further comprises a base feedback capacitor permanently connected across the operational amplifier.

5. The pixel of claim 4, wherein a capacitance of the base feedback capacitor is less than the capacitance of the second photosensitive portion.

6. The pixel of claim 3, wherein the ladder capacitors comprise at least two capacitors having equal capacitances.

7. The pixel of claim 3, wherein the ladder capacitors include respective capacitances that are successively exponentially related.

8. The pixel of claim 1, comprising a memory to store a difference between a dark current generated by the first photosensitive portion and a dark current generated by the second photosensitive portion.

9. The pixel of claim 1, wherein the first and second photosensitive portions are adjacent each other; and further comprising pixel readout circuitry adjacent both the first and second photosensitive portions.

10. The pixel of claim 9, wherein the first photosensitive portion, second photosensitive portion and readout electronics are arranged in a stacked relation.

11. The pixel of claim 9, further comprising a guard ring structure at a boundary between the first and second photosensitive portions and the pixel readout circuitry.

12. The pixel of claim 9, wherein each of the first and second inputs of the amplifier includes two connection ports respectively positioned at opposing sides of the pixel readout circuitry.

13. The pixel of claim 1, wherein the first and second photosensitive portions each comprise diagonally separated sub-portions.

14. The pixel of claim 1, wherein the first and second photosensitive portions comprise respective triangular portions.

15. The pixel of claim 1, wherein one of the first and second photosensitive portions comprises a square portion and the other of the first and second photosensitive portions comprises four triangular portions respectively positioned adjacent each side of the square.

16. The pixel of claim 1, wherein each of the first and second photosensitive portions comprises at least one collection node each defining an island surrounded by epitaxial material.

17. The pixel of claim 16, wherein a surface of the first and second photosensitive portions is covered by a conducting layer that is electrically connected to the pixel readout circuitry except for a narrow zone around the collection node.

18. The pixel of claim 16, wherein the second photosensitive portion is positioned around the first photosensitive portion.

19. The pixel of claim 16, wherein the second photosensitive portion occupies less surface area than the first photosensitive portion.

20. The pixel of claim 19, wherein a spacing of collection nodes in the second photosensitive portion is less than the spacing of collection nodes in the first photosensitive portion.

21. The pixel of claim 1, further comprising a metal layer selectively covering the second photosensitive portion to shield it from incident light.

22. The pixel of claim 1, further comprising a barrier for constraining a bio-optical analyte to an area overlying the first photosensitive portion, thereby shielding the second photosensitive portion from incident light generated by a chemical reaction between the analyte and a reagent.

23. An image sensing array for an image sensor and including a plurality of pixels each comprising:
a first photosensitive portion;
a second photosensitive portion shielded from incident light and individually associated with said first photosensitive portion; and
an amplifier arranged to receive a signal from the first photosensitive portion at a first input, and to receive a signal from the second photosensitive portion at a second input;
the amplifier comprising an operational amplifier including a negative feedback loop comprising a feedback capacitance and associated switch to discharge the operational amplifier, and the feedback capacitance being based upon a capacitance of the second photosensitive portion.

24. The array of claim 23, wherein the plurality of pixels comprise a first row of pixels oriented in a first direction, and a second row of pixels oriented in an opposite direction.

25. The array of claim 24, wherein adjacent pixels in at least one of the first and second rows have opposite orientations.

26. The array of claim 24, further comprising pixel readout circuitry adjacent both the first and second photosensitive portions of each pixel; wherein an orientation of the pixel readout circuitry is constant across the array.

27. An image sensor comprising an image sensing array according to claim 23.

28. The image sensor of claim 27, wherein the plurality of pixels comprise a first row of pixels oriented in a first direction, and a second row of pixels oriented in an opposite direction.

29. The image sensor of claim 28, wherein adjacent pixels in at least one of the first and second rows have opposite orientations.

30. The image sensor of claim 27, further comprising pixel readout circuitry adjacent both the first and second photosensitive portions of each pixel; wherein an orientation of the pixel readout circuitry is constant across the array.

31. The image sensor of claim 27, further comprising a barrier for constraining a bio-optical analyte to an area overlying the first photosensitive portion, thereby shielding the second photosensitive portion from incident light generated by a chemical reaction between the analyte and a reagent; the image sensor defining a bio-luminescence sensing device.

32. An electronic device including an image sensor according to claim 27.

33. The electronic device of claim 32, wherein the electronic device defines an optical pointing device.

34. The electronic device of claim 32, wherein the electronic device defines a mobile telephone.

35. The electronic device of claim 32, wherein the electronic device defines a webcam.

36. The electronic device of claim 32, wherein the electronic device defines an ambient light sensor.

37. An intra-pixel method for cancellation of dark current noise in an image sensing array, the method comprising:
generating a first input for an operational amplifier based on a signal from a first photosensitive portion;
generating a second input for the amplifier based on a signal from a second photosensitive portion shielded from incident light and individually associated with said first photosensitive portion;
outputting a differential signal from the amplifier as a dark-current-cancelled pixel output; and
providing the operational amplifier with a negative feedback loop including a feedback capacitance and switch for discharging the operational amplifier, and the feedback capacitance being based upon a capacitance of the second photosensitive portion.

38. The method of claim 37, further comprising varying the feedback capacitance which is applied to the operational amplifier.

39. The method of claim 38, wherein varying the feedback capacitance comprises selectively connecting at least one of a plurality of ladder capacitors which are arranged in parallel across the operational amplifier.

40. The method of claim 38, further comprising storing a difference between a dark current generated by the first photosensitive portion and a dark current generated by the second photosensitive portion in a memory; and wherein varying the feedback capacitance is based upon the stored difference.

41. The method of claim 40, wherein the dark current in each photosensitive portion is set to be equal and the capacitance of the second photosensitive portion is set to be equal to the feedback capacitance of the operational amplifier.

42. The method of claim 37, further comprising selecting a ratio of the dark current in the first photosensitive portion to the feedback capacitance based upon a ratio of the dark current in the second photosensitive portion to an intrinsic capacitance thereof.

* * * * *